(12) United States Patent
Agnihotri et al.

(10) Patent No.: US 11,819,999 B2
(45) Date of Patent: Nov. 21, 2023

(54) INPUT DEVICES HAVING A DEFORMABLE MEMBRANE AND METHODS OF USING THE SAME

(71) Applicant: Toyota Research Institute, Inc., Los Altos, CA (US)

(72) Inventors: Abhijeet Agnihotri, Boston, MA (US); Naveen Suresh Kuppuswamy, Arlington, MA (US); Alexander Alspach, Somerville, MA (US); Katherine Tsui, Watertown, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 82 days.

(21) Appl. No.: 17/159,699

(22) Filed: Jan. 27, 2021

(65) Prior Publication Data

US 2022/0234212 A1    Jul. 28, 2022

(51) Int. Cl.
| | | |
|---|---|---|
| *G06F 3/048* | (2013.01) | |
| *B25J 13/08* | (2006.01) | |
| *G06F 3/0354* | (2013.01) | |
| *G06F 3/01* | (2006.01) | |
| *G06F 3/042* | (2006.01) | |

(Continued)

(52) U.S. Cl.
CPC ............ *B25J 13/084* (2013.01); *G05B 19/19* (2013.01); *G05B 19/409* (2013.01); *G06F 3/017* (2013.01); *G06F 3/03541* (2013.01); *G06F 3/042* (2013.01); *G06F 3/048* (2013.01); *G05B 2219/39319* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 10,549,428 | B2 | 2/2020 | Alspach et al. |
| 10,668,627 | B2 | 6/2020 | Alspach et al. |

(Continued)

FOREIGN PATENT DOCUMENTS

WO        2013173624 A2    11/2013

OTHER PUBLICATIONS

The bubble technique: interacting with large virtual environments using haptic devices with limited workspace (https://www.researchgate.net/publication/4131411_The_Bubble_technique_interacting_with_large_virtual_environments_using_haptic_devices_with_limited_workspace), Apr. 1, 2005.

*Primary Examiner* — Xuyang Xia
(74) *Attorney, Agent, or Firm* — DINSMORE & SHOHL LLP

(57) ABSTRACT

Input devices having a deformable membrane and methods of their use are disclosed. In one embodiment, an input device includes a body, a deformable membrane coupled to the body such that the body and the deformable membrane define an enclosure filled with a medium, and an internal sensor disposed within the enclosure, the internal sensor having a field of view configured to be directed through the medium and toward a bottom surface of the deformable membrane. The input device further includes a controller configured to receive an output signal from the internal sensor corresponding to a deformation in the deformable membrane, determine a gesture based on the output signal from the internal, and provide a gesture signal corresponding to the gesture.

14 Claims, 9 Drawing Sheets

(51) Int. Cl.
    *G05B 19/19*     (2006.01)
    *G05B 19/409*     (2006.01)

(56) References Cited

U.S. PATENT DOCUMENTS

| | | |
|---|---|---|
| 2010/0201503 A1 | 8/2010 | Laurent et al. |
| 2010/0245246 A1* | 9/2010 | Rosenfeld ............. G06F 3/0383 |
| | | 345/163 |
| 2010/0283727 A1 | 11/2010 | Jiang et al. |
| 2010/0295787 A1* | 11/2010 | Tang .................. G06F 3/03543 |
| | | 345/166 |
| 2012/0133496 A1 | 5/2012 | Aono |
| 2016/0147333 A1* | 5/2016 | Levesque .......... H04M 1/72412 |
| | | 345/161 |
| 2018/0246574 A1* | 8/2018 | Modarres .............. G06F 3/0487 |
| 2018/0299972 A1* | 10/2018 | Saito ....................... G06F 3/017 |
| 2019/0091872 A1* | 3/2019 | Alspach .................... G01L 1/04 |
| 2020/0201438 A1 | 6/2020 | Mandeville et al. |
| 2020/0246980 A1 | 8/2020 | Kuppuswamy et al. |
| 2020/0270777 A1 | 8/2020 | Podhajny et al. |
| 2021/0349444 A1* | 11/2021 | Hemmer ................ B25J 9/1664 |

* cited by examiner

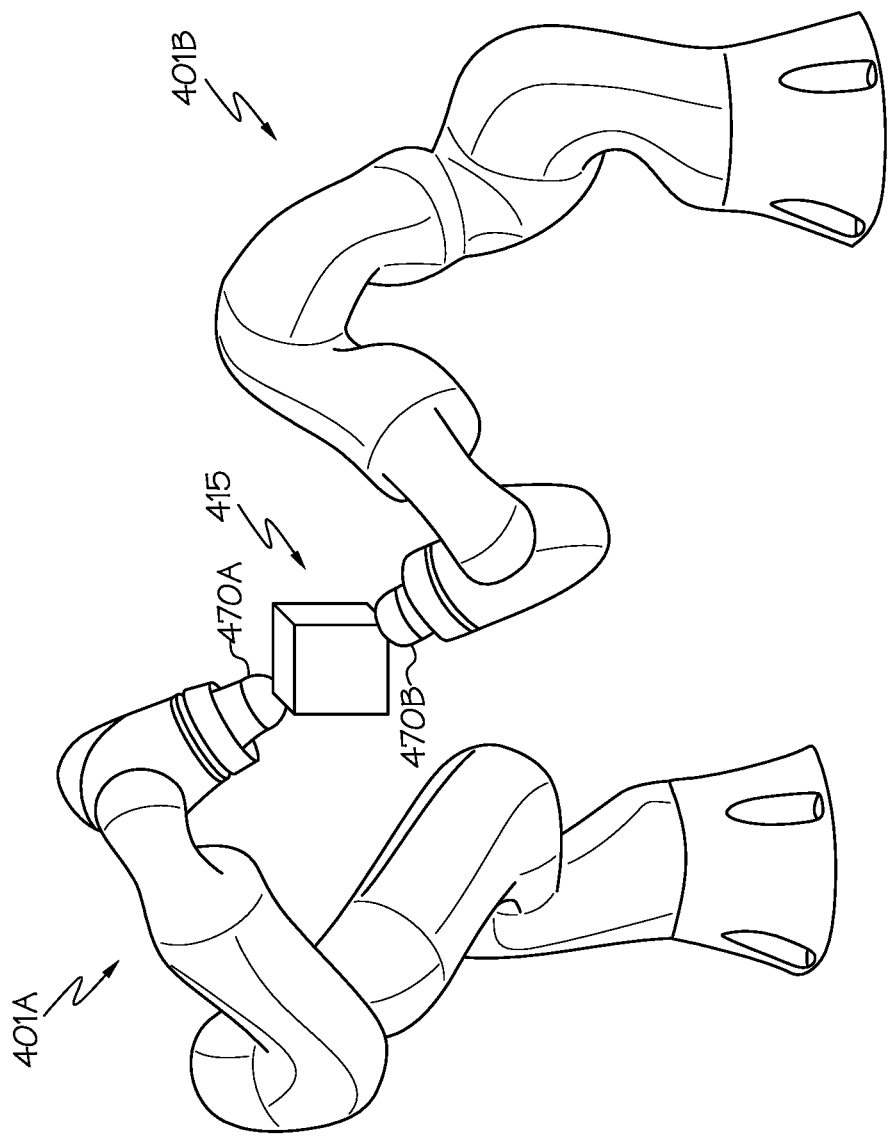

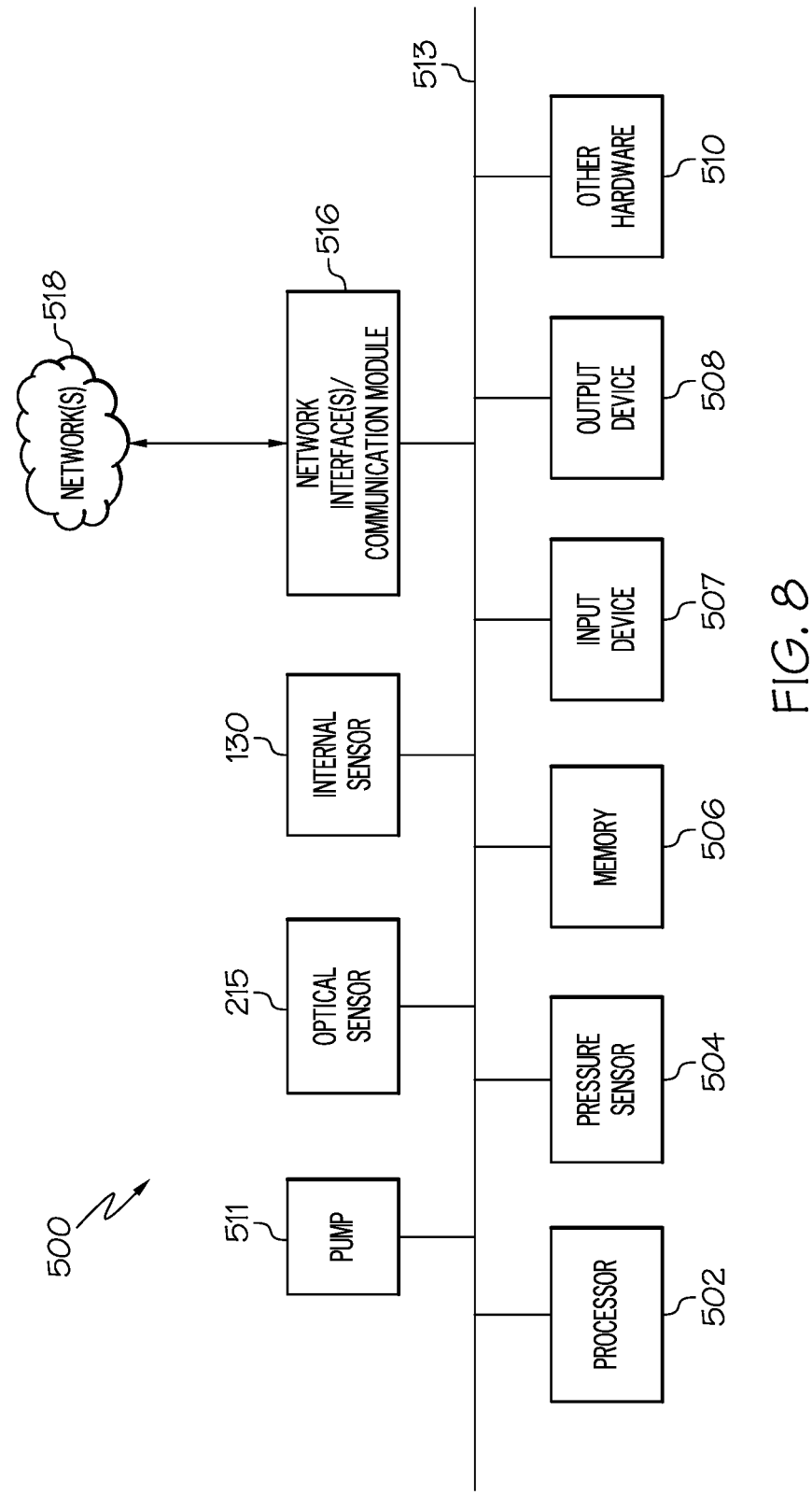

US 11,819,999 B2

INPUT DEVICES HAVING A DEFORMABLE MEMBRANE AND METHODS OF USING THE SAME

TECHNICAL FIELD

Embodiments described herein generally relate to input devices and, more particularly, to input devices having a deformable membrane for controlling computing devices and robots.

BACKGROUND

Input devices are used to control or otherwise provide input to an electronic device. One example input device is a mouse that is used to provide inputs to a computing device, such as a personal computer. The mouse is used to control a mouse cursor displayed on the electronic display of the computing device. However, the mouse is limited to the number of input buttons it has, and the mouse does not enable an input based on the amount of force applied to the buttons.

Additionally, an electronic device configured as a robot typically needs to be controlled or otherwise trained, which may be an arduous task. Robot training devices also do not have force-sensitive input controls, and are not natural for users to control the robot.

Thus, alternative input devices for electronic devices may be desired.

SUMMARY

In one embodiment, an input device includes a body, a deformable membrane coupled to the body such that the body and the deformable membrane define an enclosure filled with a medium, and an internal sensor disposed within the enclosure, the internal sensor having a field of view configured to be directed through the medium and toward a bottom surface of the deformable membrane. The input device further includes a controller configured to receive an output signal from the internal sensor corresponding to a deformation in the deformable membrane, determine a gesture based on the output signal from the internal, and provide a gesture signal corresponding to the gesture.

In another embodiment, a method of controlling an electronic device using an input device includes receiving, from an internal sensor within an enclosure filled with a medium defined by a body and a deformable membrane, an output signal corresponding to a deformation of the deformable membrane, determining a gesture from the output signal of the internal sensor, and providing a gesture signal corresponding to the gesture to a computing device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 schematically depicts two robots manipulating a target object using deformable sensors according to one or more embodiments described and illustrated herein; and FIG. 8 schematically depicts hardware components of a computing environment including an input device according to one or more embodiments described and illustrated herein.

DETAILED DESCRIPTION

Embodiments of the present disclosure are directed to input devices having a deformable membrane and methods of operating an input device having a deformable membrane. Typical input devices, such as computer mice, are limited into the number of buttons to be used as inputs to an electronic device, such as a personal computer. Further the locations of the buttons are static in nature, and cannot be moved by the user. Traditional computer mice also do not provide for the ability to use force as an input control to the electronic device. In an example, the amount of force a user applies to the input device could control the input to the electronic device (e.g., greater force provides a greater value of whatever parameter the input device is being used to input). However, traditional input devices do not have this capability.

Additionally, traditional robot training devices are difficult to operate, and commonly can only be done by trained professionals. These devices may have many static inputs that a user must learn to properly control the robot. Thus, traditional robot training devices are unsatisfactory.

Embodiments of the present disclosure employ an input device having a body and a deformable membrane that is attached to the body. The deformable membrane and the body define an enclosure that is filled with a medium. An internal sensor detects a location of one or more indentions in the deformable membrane caused by a user, such as by the user's fingers or an object pressed into the deformable membrane. Indentions in different locations may be used as different inputs. Thus, the input device can be programmed to have "buttons" at any location on its surface. Further, various gestures can be used as inputs, such as sliding a finger in a motion on the deformable membrane. The input device may also be used to train or otherwise control a robot. Many other applications for the input devices described herein are possible.

Various embodiments of input devices configured as deformable sensors are described hereinbelow.

Figure 1:
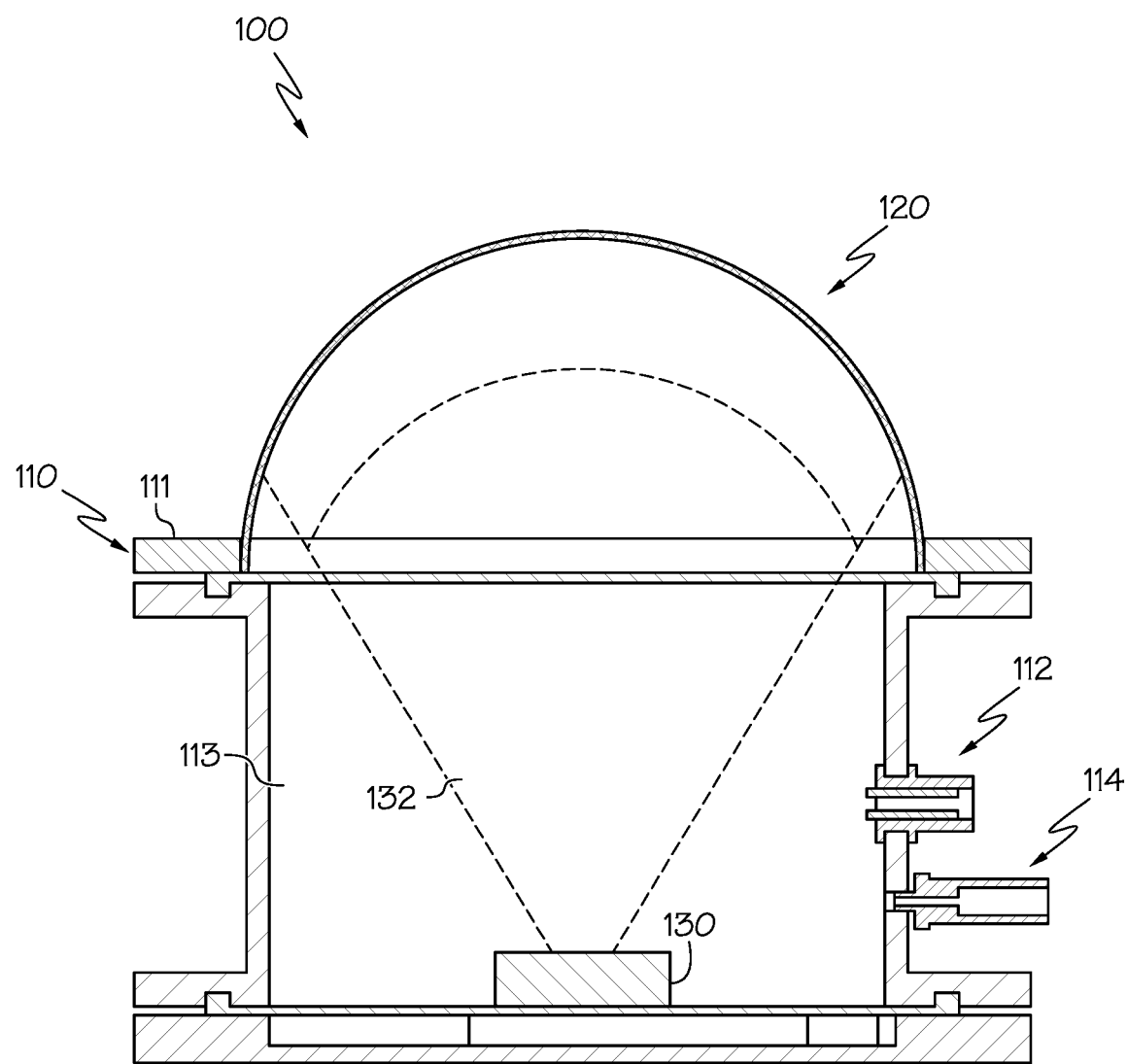
FIG. 1 schematically depicts an elevation view of an example deformable sensor according to one or more embodiments described and illustrated herein.
Figure 2:
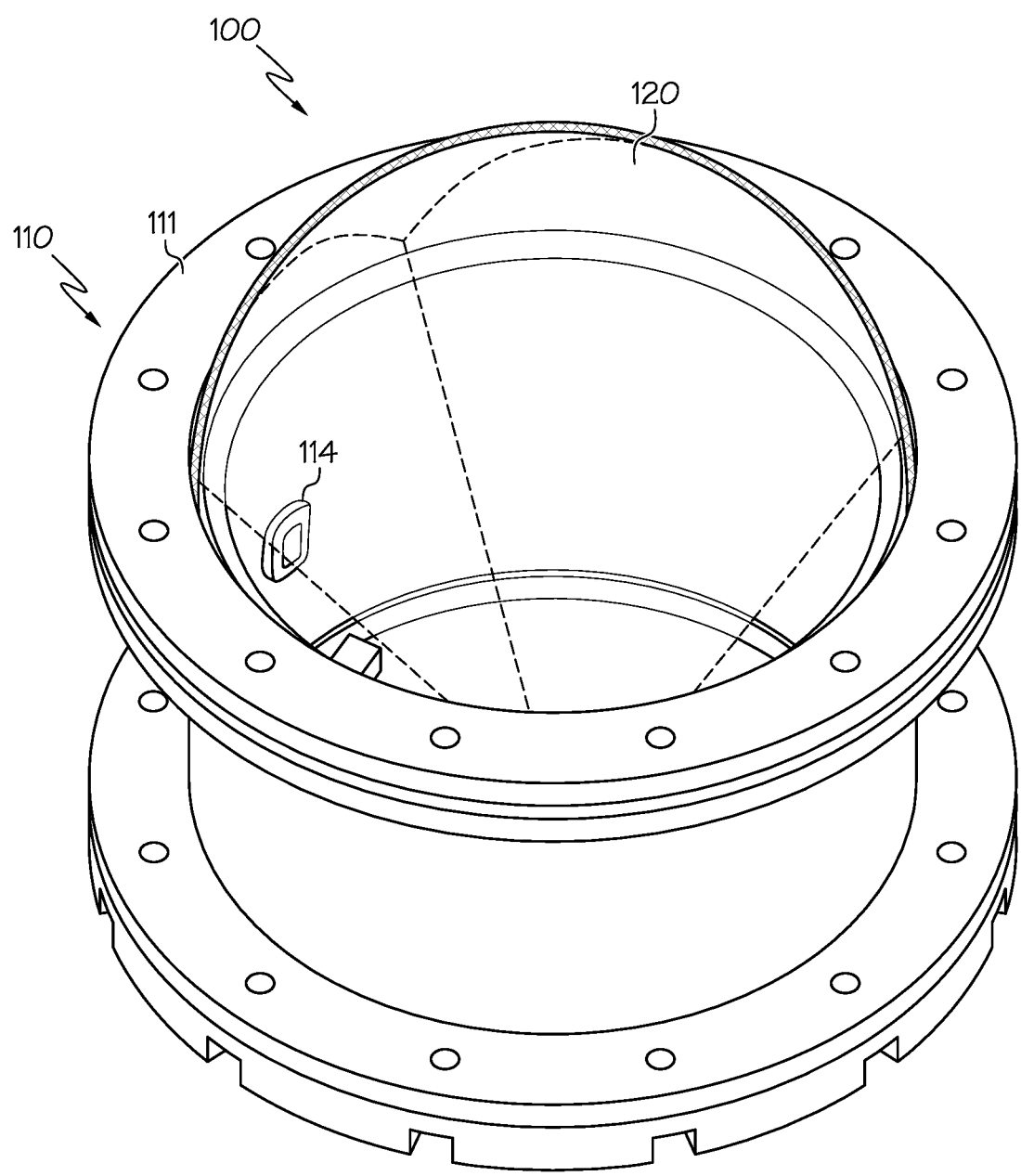
FIG. 2 schematically depicts a top perspective view of the example deformable sensor depicted by FIG. 1 according to one or more embodiments described and illustrated herein.

Referring now to FIGS. 1 and 2, an example deformable sensor 100 that may be used as an input device to a computing device (e.g., a desktop computer, a laptop computer, a tablet, a smartphone and the like) or a robot is schematically illustrated. FIG. 1 is a front elevation view of the example deformable sensor 100 and FIG. 2 is a top perspective view of the example deformable sensor 100. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other similar substance. In some embodiments, a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. As described in more detail below, the internal sensor 130 may be capable of detecting deflections of the deformable membrane 120 when the deformable membrane 120 comes into contact with an object.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In others, a sensitive time-of-flight sensor such may be used as a high spatial resolution internal sensor 130 that provides dense tactile sensing. Thus, the internal sensor 130 may be modular because the sensors may be changed depending on the application. In some embodiments robots feature varying touch sensitivity due to varying spatial resolution and/or depth resolution.

However, utilizing a time-of-flight sensor may not be ideal for a variety of reasons. A time-of-flight sensor may larger than other types of sensors. As such, in order to accommodate a time-of-flight sensor, the deformable sensor 100 may need to be larger than may otherwise be desired, thereby constraining the size of the deformable sensor 100. In addition, a time-of-flight sensor may have undesirable range limitations. In particular, at very close ranges, a time-of-flight sensor may not properly determine depths. Accordingly, in some embodiments, the internal sensor 130 may comprise an imaging sensor configured to capture an image of the deformable membrane 120 and determine depth of the various points of the deformable membrane 120 based on the captured image. Estimating depth from a single image is inherently an ill-posed problem since there are infinite possible world states that could have generated the image. However, it is possible to train a neural network to learn appearance-based features capable of outputting a dense depth map containing per-pixel distance estimates. Accordingly, the internal sensor 130 may utilize a trained neural network to estimate depth based on a captured image, as disclosed herein.

In one example, the internal sensor 130 may comprise a monocular image sensor configured to capture an image of the deformable membrane 120. However, in other examples, the internal sensor 130 may comprise any other type of camera or imaging sensor capable of capturing images. In embodiments, the internal sensor 130 may capture an image of the deformable membrane 120 when it is deformed by an object and may determine a depth value for each pixel of the captured image utilizing a trained neural network, as described below.

A neural network may be trained to receive an image captured by the internal sensor 130 and estimate a depth value for each pixel of the image during a training phase. After the neural network is trained, the neural network may be used to estimate a depth value for each pixel of a captured image during an operation phase. In order to train such a neural network, a large number of training examples may be acquired during the training phase, and the neural network may be trained using supervised learning techniques, as disclosed herein. In particular, training examples may comprise captured example images along with ground truth values comprising known depth values for the pixels of each captured image. Additional information regarding an internal sensor with monocular depth estimation is provided in U.S. patent application Ser. No. 17/147,935 entitled "Robust and Perceptive Manipulation Through Soft-Bubble Grippers and Monocular Depth," which is hereby incorporated by reference in its entirety.

Figure 3:
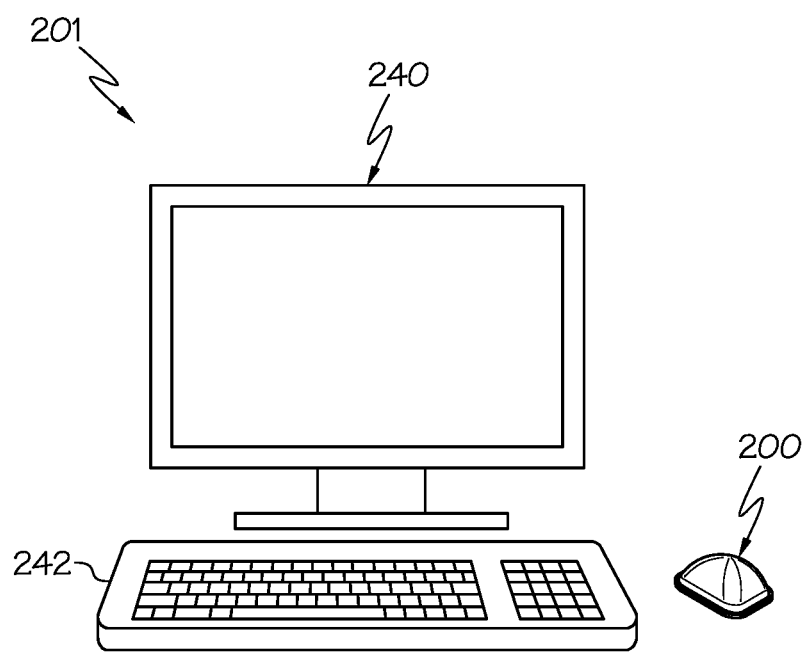
FIG. 3 schematically depicts a computing environment including a input device configured as a deformable sensor according to one or more embodiments described and illustrated herein.

The deformable sensors described herein may be used as an input device to control or otherwise provide input to an electronic device, such as, without limitation, a computing device or a robot. FIG. 3 illustrates an example computing environment 201 comprising an input device 200 configured as a mouse-like input device for providing input to a computing device 240. In the illustrated embodiment, the computing device 240 is an all-in-one personal computer. However, it should be understood that the computing device may be a laptop, a tablet, a server, or any other type of computing device. The example computing environment 201 further includes a keyboard 242 for providing additional inputs to the computing device 240.

Figure 4A:
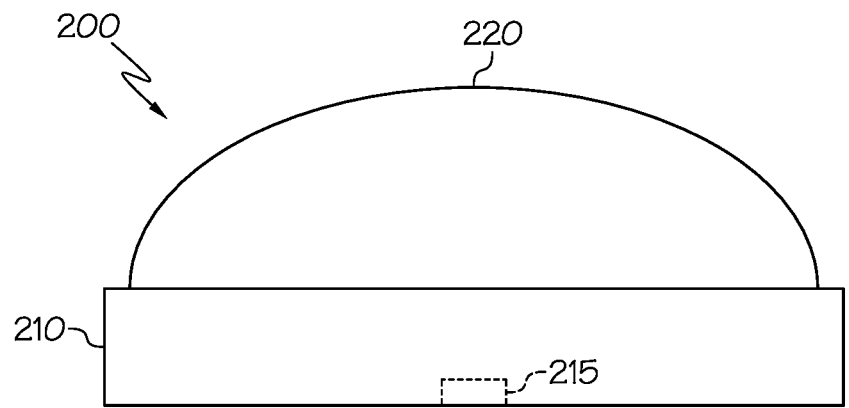
FIG. 4A schematically depicts a side elevation view of an example input device according to one or more embodiments described and illustrated herein.
Figure 4B:
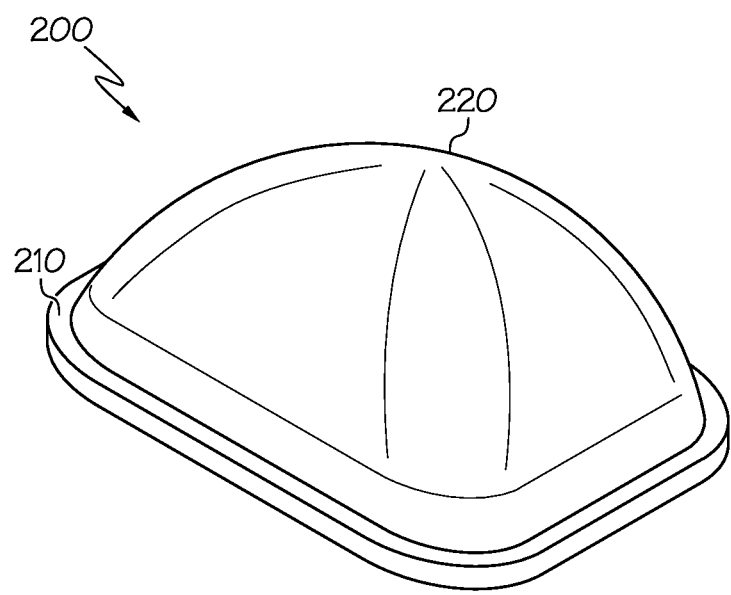
FIG. 4B schematically depicts a top perspective view of the example input device shown in FIG. 4A according to one or more embodiments described and illustrated herein.
Figure 4C:
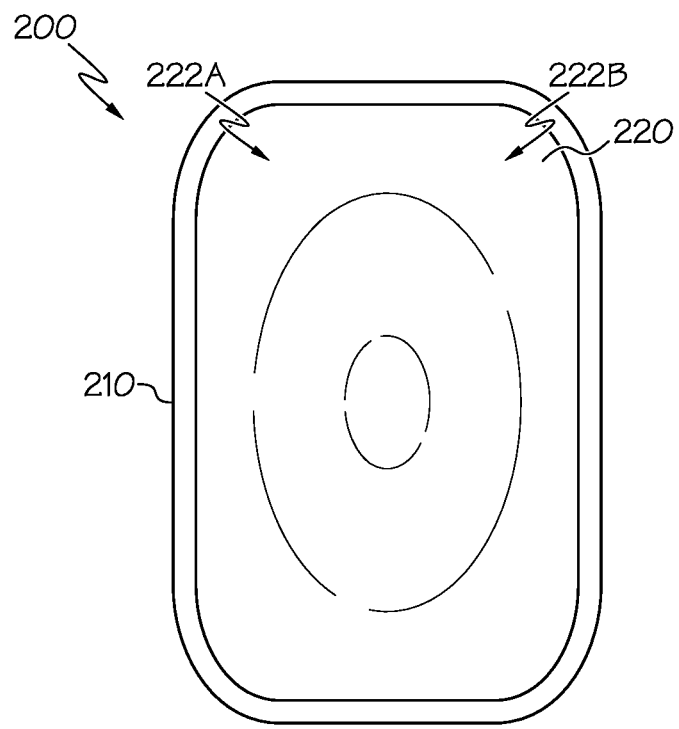
FIG. 4C schematically depicts a top view of the example input device shown in FIGS. 4A and 4B according to one or more embodiments described and illustrated herein.

FIGS. 4A-3C illustrate the example input device 200 shown in FIG. 3 in greater detail. FIG. 4A is a side elevation view of the input device 200, FIG. 4B is a top perspective view of the input device 200, and FIG. 4C is a top view of the input device 200. The example input device 200 is generally shaped and configured as computer mouse device. However, embodiments are not limited by the shape and configuration of the input device. in the illustrated example, the input device includes a rigid body 210, and a deformable membrane 220 which is attached to the rigid body 210 to define an enclosure (not shown) in a manner similar to the housing 110 and deformable membrane 120 illustrated in FIGS. 1 and 2. The input device 200 further includes an internal sensor (not shown, but similar to the internal sensor 130 shown in FIG. 2) within the enclosure that is configured to detect deformation of the deformable membrane 120.

The example input device 200 further includes an optical sensor 215 within a bottom surface of the body 210 that is configured to track a position of the input device 200 on a surface, such as to control a mouse cursor on an electronic display of the computing device 240, for example. The optical sensor 215 may be configured as a mouse laser diode and photodiode for producing a position signal, for example. Thus, a user may use the input device 200 to move a mouse cursor on an electronic display in a traditional manner in some embodiments. It should be understood that in other embodiments no optical sensor is provided.

The input devices described herein enable inputs that were not previous possible using conventional input device, such as mice. The deformable membrane 220 enables any region of the top surface of the input device 200 to be configured as a selectable region and thus a "button." For example, a top-left region 222A may be configured to function as a left-button of a traditional mouse input device. Thus, when the user deforms the deformable membrane 220 with his or her index finger of the right hand, the internal sensor detects this deformation and produces an output similar to that of a left-button click of a traditional mouse input device. Similarly, a top-right region 222B may be configured to function as a right-button of a traditional mouse input device.

Figure 4D:
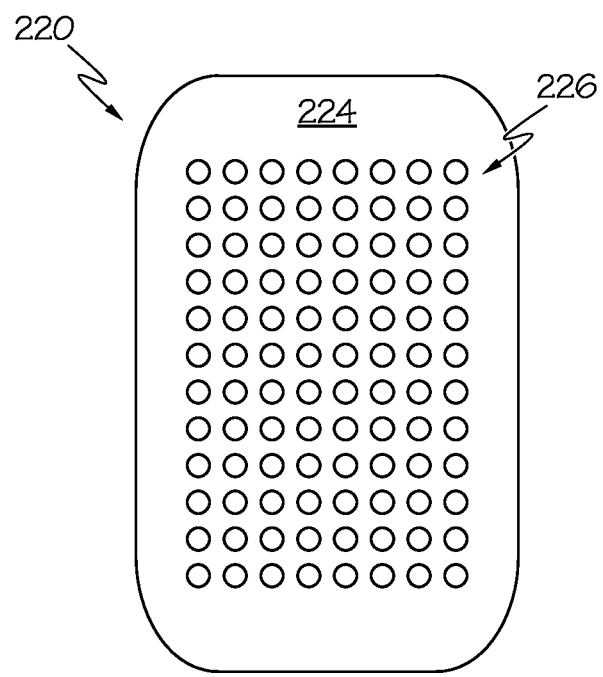
FIG. 4D schematically depicts an underside of a deformable membrane for an input device according to one or more embodiments described and illustrated herein.

Referring now to FIG. 4D, in some embodiments, a pattern 226 may be provided on an underside 224 of the deformable membrane 220 to assist the detection of the deformation of the deformable membrane 220. The pattern 226 may make it easier for a depth sensor or a monocular image sensor to detect the deformation of the deformable membrane 220. In the illustrated example, the pattern 226 is an array of dots printed or otherwise applied to the underside 224 of the deformable membrane 220. The internal sensor may detect the movement of the dots, for example. However, embodiments are not limited to an array of dots. The pattern may be an arbitrary pattern of arbitrary shapes. As another example, the pattern may be lines defining a grid. It should be understood that other embodiments do not include a pattern.

Because the deformable membrane 220 may be deformed at any location and in many different manners, many other gestures may be used as input to the computing device 240 using the input device 200. Embodiments are not limited to any type of gesture. In some embodiments, the user may program the input device 200 to recognize particular gestures and what actions the computing device makes in response to those gestures. Thus, the input device 200 may be fully configurable and customizable. As a non-limiting example, a user may program different gestures for different software applications executed on the computing device 240.

Figure 5C:
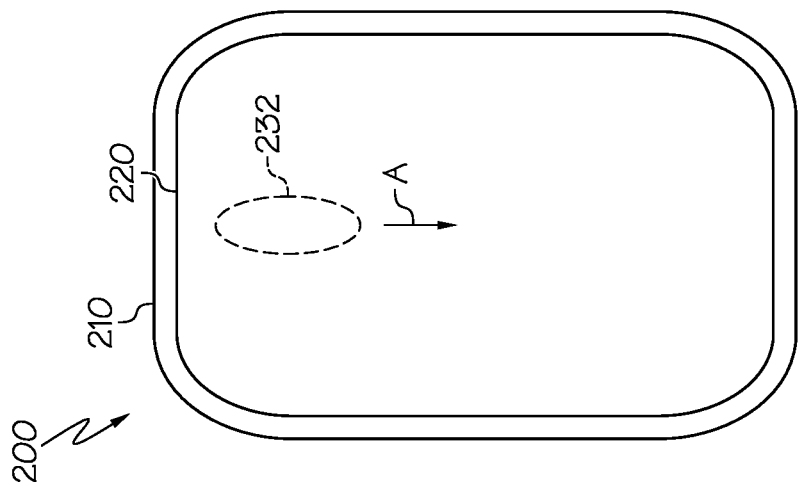
FIGS. 5A-5C schematically depict a plurality of gestures that may be provided to an input device according to one or more embodiments described and illustrated herein.
Figure 5B:
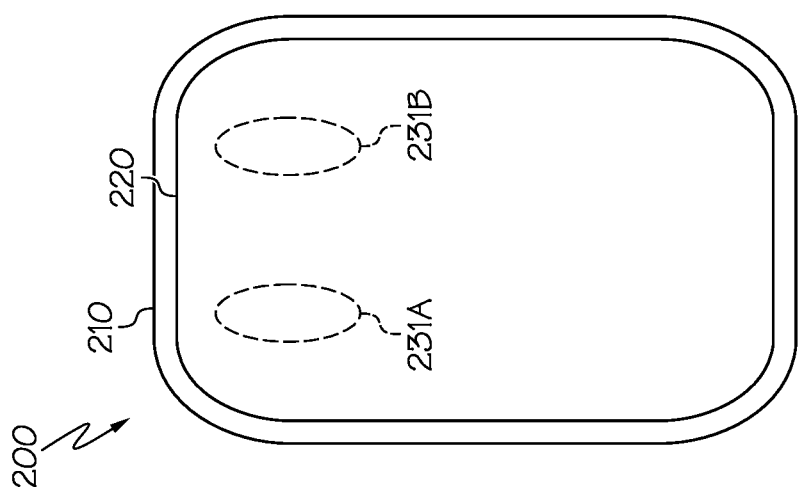
Figure 5A:
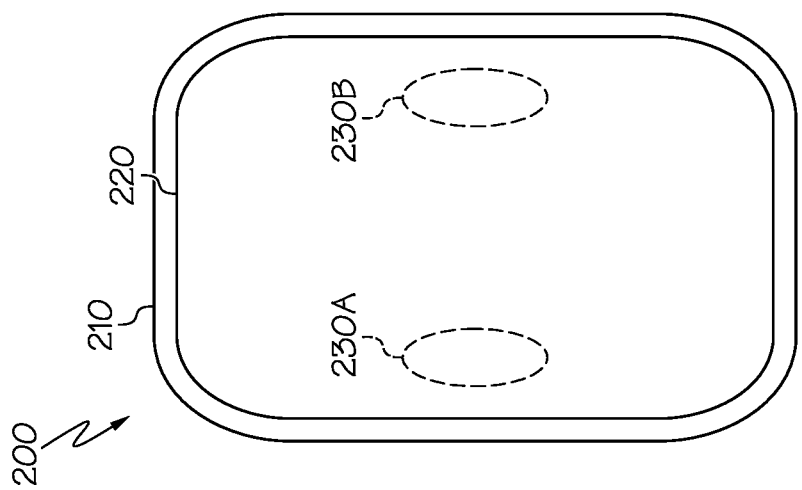

FIG. 5A illustrates one example gesture applied to the input device 200. In this example, the user squeezes the deformable membrane using a thumb and one of a middle finger, a ring finger, and a pinky finger to create a first indentation 230A and a second indentation 230B in the deformable membrane 220. The internal sensor detects the first indentation 230A and the second indentation 230B and produces a gesture signal, which is received by the computing device 240. The gesture signal may be provided to the computing device 240 by a wired or wireless connection. As a non-limiting example, the input device 200 is configured to send the gesture signal (as well as the tracking signal provided by the optical sensor 215) by the Bluetooth® wireless communication standard.

The gesture shown in FIG. 5A may cause a software program running on the computing device 240 to react in any number of ways. For example, squeezing the deformable membrane 220 may cause a graphical representation of an object to be picked up and moved. Releasing the deformable membrane 220 may cause the graphical representation of the object to be dropped in a digital design space. This is just one of countless examples.

FIG. 5B illustrates another gesture wherein a first indentation 231A and a second indentation 231B are made in the deformable membrane 220 simultaneously. Three, four, or even five indentations may be made simultaneously to provide additional gestures. Further, the whole palm of a user's hand may be pressed into the deformable membrane to generate a gesture. Many other gestures are also possible.

Gestures are not limited to static gestures. A user may move one or more indentations on the deformable membrane. FIG. 5C illustrates an example wherein an indentation 232 is made near the top of the deformable membrane 220, and then moved down toward the bottom as indicated by arrow A. One or more indentations may be moved in any direction, such as in a circular direction, a lateral direction, a vertical direction, and the like. A user may move two indentations closer together, or move two indentations further apart, for example. These movements produce different gestures for receipt and interpretation by the computing device 240. As a non-limiting example, a user may move an indentation on the deformable membrane 220 to move a mouse cursor on the electronic display.

The deformable membrane 220 also provides the ability for the input device 200 to produce gesture signals based on a depth of indentations made into the deformable membrane 220. Thus, the depth into which a user presses into the deformable membrane may control functions of a software program executed by computing device 240. As a non-limiting example, the further the user depresses into the deformable membrane 220, the more a particular setting increases (e.g., volume of sound emitted from the computing device 240). Thus, the input devices of the present disclosure add an additional dimension for providing gestural inputs to a computing device over traditional input devices.

It is noted that the input devices described herein act as passive haptic devices. The further a user presses into the deformable membrane, the more difficult it is to further deform the deformable membrane and press in deeper. Thus, the input device provides an elastic feedback to the user so that the user knows how deeply he or she has pressed into the input device.

In some embodiments, the input device 200 includes a pump device 510 (see FIG. 8) that is operable to change the pressure within the enclosure. The pressure may be changed according to user preferences and comfort, for example. The pressure may also be changed to change the sensitivity of the input device 200 with respect to gestures using the depth of the indentations into the deformable membrane 220. When the pressure is increased, it is more difficult to deform the deformable membrane 220, and thus the sensitivity of the input device 200 is increased. When the pressure is decreased, it is easier to deform the deformable membrane 220, and thus the sensitivity of the input device 200 is decreased.

Figure 6:
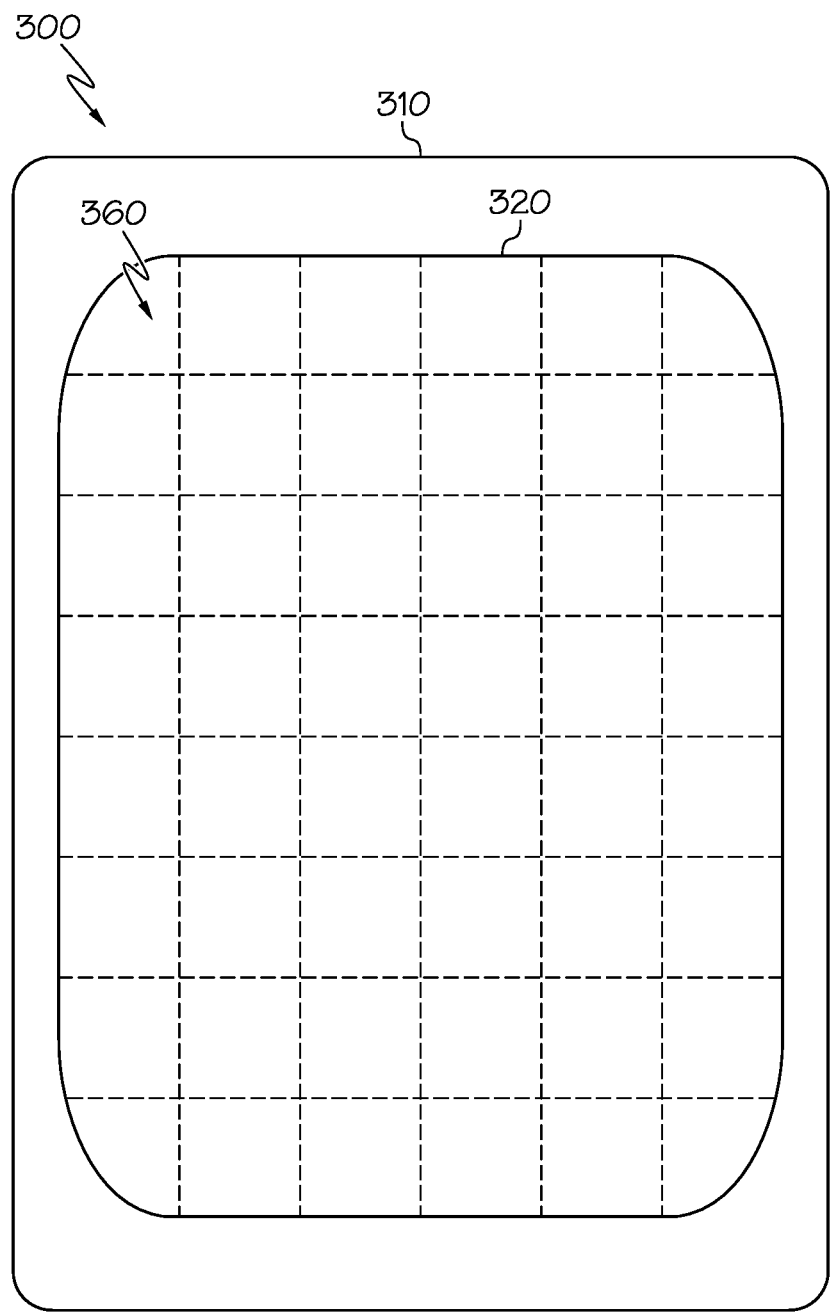
FIG. 6 schematically depicts a top view of another example input device according to one or more embodiments described and illustrated herein.

Embodiments are not limited to input devices configured as a mouse input device. Rather, the input devices described herein may take on any shape and configuration. Referring now to FIG. 6, an example input device 300 configured as a tablet rather than a mouse input device is illustrated. The tablet shape may provide a larger working surface for the user to perform more complex tasks, such as train or otherwise control a robot, for example. The example input device 300 includes a body 310 and a deformable membrane 320 attached to the body 310. The deformable membrane 320 and the body 310 define an enclosure filled with a medium. One or more internal sensors are disposed within the enclosure and have a field of view of an underside of the deformable membrane 320. Depending on the size of the input device 300, it may desirable to have multiple internal sensors within the enclosure.

The deformable membrane 320 defines a working space. In the illustrated embodiment, the deformable membrane is divided into a plurality of zones 360. Each zone may be used to provide a different input and/or functionality to the electronic device that is being controlled. However, embodiments are not limited to the working space being divided into zones. Similar to the input device 200 shown in FIGS. 4A-4C, any number of gestures may be impressed into the deformable membrane 320 to generate gesture signals.

The larger working space provided by the table-style input device 300 may enable users to impress an object into the deformable membrane 320. In some embodiments, the input device 300, alone or in conjunction with a computing device, may detect both the type of the object and the pose of the object based on the deformation of the deformable membrane 320. As a non-limiting example, the input device 300 may be used to train a robot to detect a type of object and a pose of the object using a deformable sensor as a robot end effector. FIG. 7 provides an example of a first robot 401A and a second robot 401B cooperating to manipulate an object 415. It should be understood that embodiments are not limited to two robots, and that a single robot may also be utilized. In the illustrated example, the first robot 401A has a first deformable sensor 470A, and the second robot 401B has a second deformable sensor 470B. The first and second deformable sensors 470A, 470B make contact with the object 415, which leaves an imprint on both the first and second deformable sensors 470A, 470B. Based on the imprints, the first and second robots 401A, 401B may detect the type and the pose of the object 415.

The tablet input device 300 may be used to train the robots to detect the type and pose of objects. For example, the user may imprint an object into the working space of the input device 300 at a plurality of poses, and input into a computing device the type of object and the pose of the object for each imprint. In this manner, a user may teach the robot various objects and their poses so that the robot may automatically detect a type and pose of an object in a tactile fashion using a deformable sensor. Embodiments of the present disclosure may utilized object type and pose detection using the processes described in U.S. Pat. No. 10,668,627, which is hereby incorporated by reference in its entirety.

The input device 300 of FIG. 6 may be used to train or otherwise control a robot in other ways. For example, first gesture in the deformable membrane 320 may be used to control the end effector of a robot, and a second gesture in the deformable membrane 320 may be used to control the joints of a robot. As a non-limiting example, moving two fingers across the working space of the deformable membrane 320 may produce a first control signal may cause the end effector to move in a certain way, and moving three fingers across the working space of the deformable membrane 320 may produce a second control signal that may cause one or more joints to move in a certain way (i.e., a robot joint control signal).

Other applications for the input devices described herein are also possible. An input device, such as the input device 300 shown in FIG. 6, may be used as an input device and/or a musical instrument in the production and/or performance of music. For example, the input device 300 may include electronic components such that it is configured as an interface for a real-time effects processor and/or sampler for use in the creation of music. For example, the various zones 360 of the deformable membrane 320 may be used as individual inputs to produce different effects. In some embodiments, the input device includes light sources (e.g., light emitting diodes) within the enclosure that are configured to illuminate the specific zones 360 to show the user which zones are active and producing sound. The depth the user presses into the deformable membrane 320 (e.g., within a zone 360) may also control the sound that is emitted. Thus, a pressure control is also provided, which greatly expands the functionality of the input device 300 for producing music. The deformable nature of the input device 300 provides the user with passive haptic feedback because the user can feel the change in resistance as his or her finger(s) are pressed into the deformable membrane 320.

Turning now to FIG. 3, a block diagram illustrates an example of a computing environment 500 through which embodiments of the disclosure can be implemented, such as (by way of non-limiting example) a deformable sensor 100, an internal sensor 130, or any other device described herein. The computing environment 500 described herein is but one example of a suitable computing device and does not suggest any limitation on the scope of any embodiments presented. Nothing illustrated or described with respect to the computing environment 500 should be interpreted as being required or as creating any type of dependency with respect to any element or plurality of elements. In various embodiments, a computing environment 500 may include but need not be limited to, an input device 100 and/or an internal sensor 130. In some embodiments, the input device 100 itself includes some or all of the components shown in FIG. 8. In other embodiments, components shown in FIG. 8 are provided across two or more hardware devices (e.g., a deformable sensor 100 and a computing device)

In an embodiment, the computing environment 500 includes at least one processor 502 and at least one memory component 506 (e.g., non-volatile memory and/or volatile memory). In some embodiments, the at least one processor 502 and the at least one memory component 506 are solely within the input device 100. In other embodiments, the at least one processor 502 and the at least one memory component 506 are disposed within one or more of the input device 100 and a remote computing device. The computing environment 500 can include one or more displays and/or output devices 508 such as monitors, speakers, headphones, projectors, wearable-displays, holographic displays, and/or printers, for example. The computing environment 500 may further include one or more other input devices 507 which can include, by way of example, any type of mouse, keyboard, disk/media drive, memory stick/thumb-drive, memory card, pen, touch-input device, biometric scanner, voice/auditory input device, motion-detector, camera, scale, etc.

The computing environment 500 may include computer readable storage medium 506 in the form of memory (e.g., non-volatile such as ROM, flash memory, etc., and or volatile memory such as RAM). The computer readable storage medium 506 may comprise a plurality of computer readable mediums, each of which may be either a computer readable storage medium or a computer readable signal medium. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

A network interface/communications module 516 can facilitate communications over a network 518 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 516 can be communicatively coupled to any device capable of transmitting and/or receiving data via the network 518. Accordingly, the hardware of the network interface 516 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

The input device 100 may include one or more network interfaces 312 to facilitate communication with one or more remote devices, which may include, for example, client and/or server devices. In various embodiments, components of the computing environment may be configured to communicate over a network with a server or other network computing device to transmit and receive data from one or more input devices 100, computing devices 240, robots or other devices. A network interface 312 may also be described as a communications module, as these terms may be used interchangeably.

In some embodiments, the input device 100 of the computing environment 500 includes a pumping device 511 that is configured to change the volume of fluid within the enclosure of the input device 100, and thus change the pressure within the enclosure. The pumping device may be used to control the sensitivity of the input device 100 by controlling the pressure, as described above. The input device 100 may also include a pressure sensor 504, which measures the pressure within the enclosure of the input device 100. Feedback from the pressure sensor 504 may be used to control the pumping device 511 to achieve the desired pressure within the enclosure.

As shown in FIG. 8, the input device 100 within the computing environment also includes an internal sensor for detecting the deformations of the deformable membrane 120, as described above. The input device 100 within the computing environment may also include an optical sensor 215 used as a mouse-like optical sensor to track the movement of the input device 100 on a surface.

It should now be understood that embodiments of the present disclosure are directed to input devices and methods having a deformable membrane for providing inputs to an electronic device, such as a computing device or a robot. The deformable membrane provides many locations for pressing into the deformable membrane to provide many different inputs. A vast array of gestures may be performed on the deformable membrane to provide inputs to the electronic device. The pressure within the input device may be modified according to user comfort and desired sensitivity of the input device. The input devices described herein may be used as an input device to a computing device, to control and/or or train a robot, and also as musical device, among other applications.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An input device comprising:
   a body;
   a deformable membrane coupled to the body such that the body and the deformable membrane define an enclosure filled with a medium;
   an internal sensor disposed within the enclosure, the internal sensor having a field of view configured to be directed through the medium and toward a bottom surface of the deformable membrane; and
   a controller configured to receive an output signal from the internal sensor corresponding to a deformation in the deformable membrane, determine a first gesture based on the output signal from the internal sensor, and provide a gesture signal corresponding to the first gesture, determine a second gesture, which is different from the first gesture, based on the output signal from the internal sensor, and provide a second gesture signal corresponding to the second gesture, wherein the first gesture or the second gesture is at least two fingers indented in the deformable membrane.

2. The input device of claim 1, further comprising an optical sensor disposed within a bottom surface of the body, wherein the optical sensor is configured to track a position of the input device on a surface to control a mouse cursor on an electronic display of a computing device.

3. The input device of claim 1, wherein the first gesture or the second gesture comprises a squeeze of the deformable membrane.

4. The input device of claim 1, further comprising a pumping device, wherein in response to receiving a request to vary a sensitivity of the input device, the controller is configured to control the pumping device to vary a pressure within the enclosure.

5. A method of controlling an electronic device using an input device, the method comprising:
   receiving, from an internal sensor within an enclosure filled with a medium defined by a body and a deformable membrane, an output signal corresponding to a deformation of the deformable membrane, wherein the internal sensor having a field of view configured to be directed through the medium and toward a bottom surface of the deform able membrane;
   determining a first gesture from the output signal of the internal sensor;
   providing a gesture signal corresponding to the first gesture to a computing device;
   determining a second gesture, which is different from the first gesture, based on the output signal from the internal sensor; and
   providing a second gesture signal corresponding to the second gesture, wherein the first gesture or the second gesture is at least two fingers indented in the deformable membrane.

6. The method of claim 5, wherein the computing device is a personal computer.

7. The method of claim 5, wherein the computing device is a robot.

8. The method of claim 5, further comprising:
   receiving, from an optical sensor, a position signal corresponding to a movement of the input device on a surface; and
   providing the position signal to the computing device.

9. The method of claim 5, wherein the first gesture or the second gesture comprises a squeeze of the deformable membrane.

10. The method of claim 5, wherein the first gesture or the second gesture comprises a palm imprint on the deformable membrane.

11. The method of claim 5, wherein:
    the first gesture or the second gesture comprises an indentation in the deformable membrane by an object;
    the first gesture or the second gesture signal is a pose and shape of the object; and
    the first gesture or the second gesture signal is used for training a robot to recognize the object.

12. The method of claim 5, further comprising adjusting a pressure within the enclosure to adjust a sensitivity of the input device.

13. The method of claim 5, wherein three fingers indented in the deformable membrane produces a third gesture signal.

14. The method of claim 13, wherein the first gesture signal is a robot end effector gesture signal for controlling a robot end effector and the second gesture signal is a robot joint gesture signal for controlling one or more joints of a robot.

* * * * *